United States Patent [19]
Beckett

[11] Patent Number: 5,310,980
[45] Date of Patent: May 10, 1994

[54] CONTROL OF MICROWAVE ENERGY IN COOKING FOODSTUFFS

[75] Inventor: D. Gregory Beckett, Oakville, Canada

[73] Assignee: Beckett Industries, Inc., Oakville, Canada

[21] Appl. No.: 690,570

[22] Filed: Apr. 24, 1991

Related U.S. Application Data

[63] Continuation-in-part of Ser. No. 585,289, Sep. 19, 1990, abandoned, which is a continuation of Ser. No. 442,166, Nov. 28, 1989, abandoned.

[30] Foreign Application Priority Data

Nov. 28, 1988 [GB] United Kingdom ............... 8827707

[51] Int. Cl.$^5$ .................................................. H05B 6/80
[52] U.S. Cl. ...................................... 219/709; 219/728; 426/107; 426/234; 99/DIG. 14
[58] Field of Search .................. 219/10.55 E, 10.55 F, 219/10.55 D; 426/107, 109, 234, 241, 243; 99/DIG. 14

[56] References Cited

U.S. PATENT DOCUMENTS

| | | | |
|---|---|---|---|
| 3,865,301 | 2/1975 | Pothier et al. | 219/10.55 EX |
| 3,924,013 | 12/1975 | Kane | 219/10.55 EX |
| 4,015,085 | 3/1977 | Woods | 219/10.55 E |
| 4,183,435 | 1/1980 | Thompson et al. | 219/10.55 EX |
| 4,320,274 | 3/1982 | Dehn | 219/10.55 E |
| 4,351,997 | 9/1982 | Mattisson et al. | 219/10.55 E |
| 4,398,994 | 8/1983 | Becket | 156/659.1 |
| 4,552,614 | 11/1985 | Beckett | 156/640 |
| 4,626,641 | 12/1986 | Brown | 219/10.55 E |
| 5,079,397 | 1/1992 | Keefer | 219/10.55 E |

Primary Examiner—Philip H. Leung

[57] ABSTRACT

A tray useful for the microwave cooking of prepared foodstuffs, particularly frozen foodstuffs, for consumption is structured to provide a more uniform heating of the foodstuff than has heretofore been possible. The tray comprises an outer layer formed of paperboard or molded plastic to which is laminated an inner polymeric film layer. A layer of microwave-reflective material, usually aluminum foil, is positioned between the outer and inner layers in the location of the peripheral wall of the tray and in a pattern in a portion of the bottom wall.

9 Claims, 1 Drawing Sheet

CONTROL OF MICROWAVE ENERGY IN COOKING FOODSTUFFS

REFERENCE TO RELATED APPLICATION

This application is a continuation-in-part of copending U.S. patent application Ser. No. 585,289 filed Sep. 19, 1990, (now abandoned) which itself is a continuation of U.S. patent application Ser. No. 442,166 filed Nov. 28, 1989 (now abandoned).

FIELD OF INVENTION

The present invention relates to microwave cooking of foodstuffs.

BACKGROUND TO THE INVENTION

The use of microwave energy to cook a variety of prepared foodstuffs for consumption is increasing. One of the problems associated with such cooking is to achieve an even distribution of heat in the cooked product, particularly in frozen products. For example, foodstuffs like macaroni and cheese and lasagna, which are cooked in trays, tend to be hotter in the peripheral regions of the tray than in the central regions when cooked by exposure to microwave energy.

The trays in which the foodstuffs are cooked generally are formed of rigid polymeric materials or polymeric material-coated paperboard.

It has previously been proposed in U.S. Pat. No. 4,351,997 to provide a modified form of tray structure to attempt to provide a more even heating of foodstuff in the tray when exposed to microwave radiation. This prior art tray has a bottom wall of microwave-transparent material and an upwardly-extending peripheral wall which is outwardly curved at its upper end to define a horizontally-extending peripheral rim.

The rim is partly or completely coated with a material which is reflective and opaque to microwave radiation, such as aluminum foil. The peripheral wall also is partly or completely coated with the foil material. The effect of this aluminum foil coating on the wall is to provide reflection of microwave energy towards the centre of the tray.

In this structure, therefore, both the outer surface of the rim and the walls are coated, at least partially with aluminum foil. The arrangement as described in this prior art provides aluminum metal directly in contact with the food in the tray, which is unsatisfactory in many foodstuff applications, because of the possibility of contamination of the foodstuff. The coating on the rim is said to protect the paperboard rim from being deteriorated in use of the tray.

U.S. Pat. No. 4,626,641 describes an embodiment in which a similar structure is provided. In addition to the provision of aluminum foil in the side wall of a tray, the foil also extends into the base of the container but leaves a rectangular open area in the bottom wall.

While both of these prior art structures provide an improved uniformity of heating of the foodstuff in a microwave oven, there remains a significant spread of temperature between the edge regions and core regions of the foodstuff.

SUMMARY OF INVENTION

In accordance with the present invention, there is provided an improved tray structure for the microwave cooking of a foodstuff packaged therein, which is able to obtain a much improved uniformity of heating of the foodstuff.

In the present invention, the tray is formed from a laminate structure comprising an outer continuous structural supporting substrate layer of microwave-transparent dielectric material, an outer continuous layer of polymeric film coincident with the substrate layer and a layer of microwave-reflective material located between the outer layers, which is patterned in the lower wall of the tray.

Accordingly, in one aspect, the present invention provides a novel tray for the microwave cooking of prepared foodstuffs, particularly frozen foodstuffs contained therein. The tray comprises a bottom wall and an upwardly-extending peripheral wall. The tray has a laminate structure comprising an outer layer of a structural material transparent to microwave energy, an inner layer of a flexible polymeric material coincident with the outer layer, and a layer of microwave-reflective material located between the inner and outer layer as a continuous layer in the region of the peripheral wall and extending in a microwave energy-controlling pattern along the bottom wall.

The structure of the present invention exhibits several distinctions over the art, in particular, U.S. Pat. Nos. 4,351,997 and 4,626,641. One distinction is that the aluminum foil layer in the present invention is completely protected from engagement with the foodstuff by the polymeric film layer, thereby eliminating the potential for food contamination by the metal. Another distinction is that it is unnecessary to provide metal in the area of any rim of the tray. In this regard, it has not been found necessary for the rim to be protected in the microwave environment.

In addition, and most importantly, the aluminum foil extends not only completely around the peripheral wall of the tray but also for a significant distance along the bottom wall towards the centre in the form of a pattern In contrast to U.S. Pat. No. 4,626,641, the metal is provided in the bottom wall, not as a continuous layer as in the prior art but as a patterned layer which permits a controlled degree of penetration of microwave energy. By providing the microwave-reflective layer extending not only continuously in the whole of the peripheral wall but also in patterned form in a portion of the bottom wall, the microwave energy is drawn or channelled more towards the centre of the tray, which, combined with reflection from the microwave-reflective material in the peripheral wall, leads to a more uniform heating of foodstuffs, particularly frozen foodstuffs, in the tray than has heretofore been obtained.

GENERAL DESCRIPTION OF INVENTION

Figure 1:
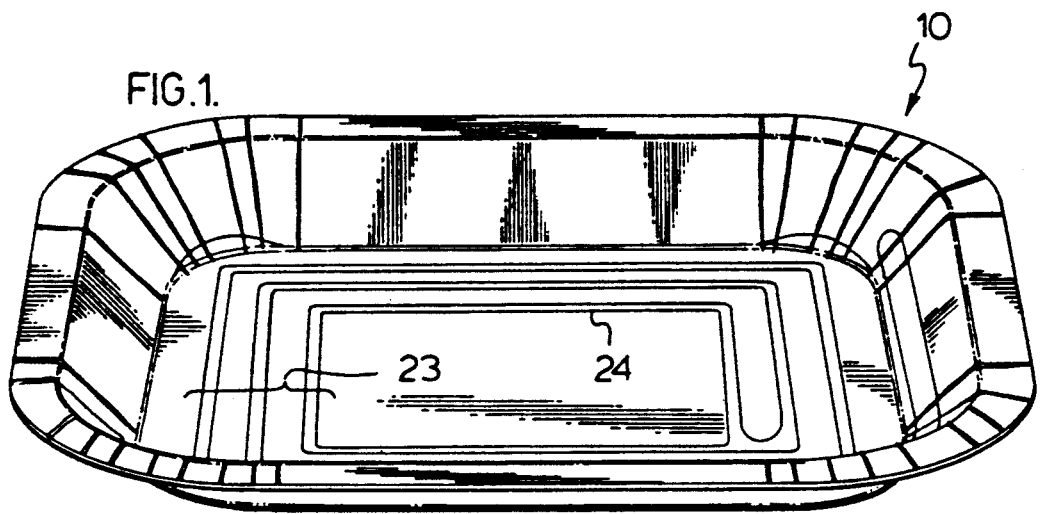
FIG. 1 is a perspective view of a microwave-heating tray provided in accordance with one embodiment of the invention.

As noted earlier, the present invention is concerned with a novel tray structure useful for the microwave heating of foodstuffs for consumption. The tray may be produced in any convenient manner from the laminate, such as by press moulding or folding.

The laminate from which the trays of the present invention are formed comprises an outer continuous structural supporting substrate layer, an outer continuous flexible polymeric film layer and a discontinuous layer of microwave-reflective material located between the outer layers.

The structural substrate of microwave-transparent dielectric material may be constructed of any convenient material, such as paperboard of suitable thickness or a polymeric material, such as a polyester or a polyolefin.

The laminate structure may be formed in any convenient manner. In one preferred embodiment, the microwave-reflective material is aluminum of a thickness of about 1 to about 15 microns, preferably about 3 to about 10 microns, typically about 7 to 8 microns.

The aluminum foil may be provided as a vapor-deposited film on the polymeric film layer or, more usually, adhered thereto by laminating adhesive. The polymeric film may be provided by any convenient flexible polymeric material which will resist thermal degradation during lamination and microwave cooking. Suitable polymeric materials include polyesters, such as "Mylar", or polyolefins, such as polyethylene.

Selective demetallization of aluminum from the portions of the surface of the aluminum layer may be effected to leave aluminum in the areas desired in the tray. Selective demetallization may be effected using an aqueous etchant, such as aqueous sodium hydroxide solution, using the procedures described in U.S. Pat. Nos. 4,398,994 and 4,552,614, the disclosures of which are incorporated herein by reference.

Following such selective demetallization of the aluminum foil layer, the polymeric film bearing the remaining aluminum is laminated to the supporting substrate layer to provide the laminate from which the tray is formed. Alternatively, but less conveniently, the supporting substrate layer may first be shaped and then the aluminized polymeric film is laminated to the supporting substrate layer.

As noted above, one of the significant structural features of the present invention is that the microwave-reflective layer extends for a significant distance along the bottom wall of the tray in the form of a microwave-energy controlling pattern.

The desired pattern is formed in the peripheral region of the bottom wall of the tray and leaves an area in the central region of the bottom wall from which the microwave-reflective material is absent. The pattern is intended to slow down or moderate penetration of microwave energy in the peripheral regions of the foodstuff, and direct more energy towards the centre of the foodstuff.

In this regard, if the bottom of the tray is left completely open, with no microwave-reflective material at all present, then the foodstuff is adequately cooked in the peripheral regions of the tray but is insufficiently cooked in the centre or core. Similarly, if the bottom of the tray is provided with a continuous layer of microwave-reflective material extending inwardly from the edges to a central aperture in such material, then, while the central region of the foodstuff is adequately cooked, the peripheral regions of the tray are insufficiently cooked.

However, by providing a pattern of microwave-reflective material in the base of the tray, the microwave energy distribution to which the foodstuff is exposed can be controlled to provide a more uniformly-cooked product than has hitherto been possible.

The pattern may take various forms depending on the shape and size of the tray and the foodstuff to be heated therein, but generally the microwave-reflective material maintains a continuous layer with the side wall layer. The pattern may take the form of strips of metal arranged in a series of rectangles, circles or squares, depending on the shape of the tray and the effects desired.

The open area of the bottom wall not having the patterned metal layer is generally shaped with the same shape as the bottom wall. Thus, if the tray is of a generally rectangular shape, the inner periphery of the metal layer also is of rectangular shape.

The proportion of the area of the bottom wall of the tray in which the pattern metal layer is provided and the proportion of metal to open area in the patterned region depend on the degree of channelling and control of penetration required for the specific foodstuff being microwave-heated in the tray.

DESCRIPTION OF PREFERRED EMBODIMENT

Referring to the drawings, a tray 10 constructed in accordance with one embodiment of the invention, is of one-pieced shaped construction formed from a laminate. The tray 10 has a bottom wall 12, a peripheral wall 14 extending upwardly and outwardly from the bottom wall and terminating in an upper outwardly-extending rim 16.

Figure 2:
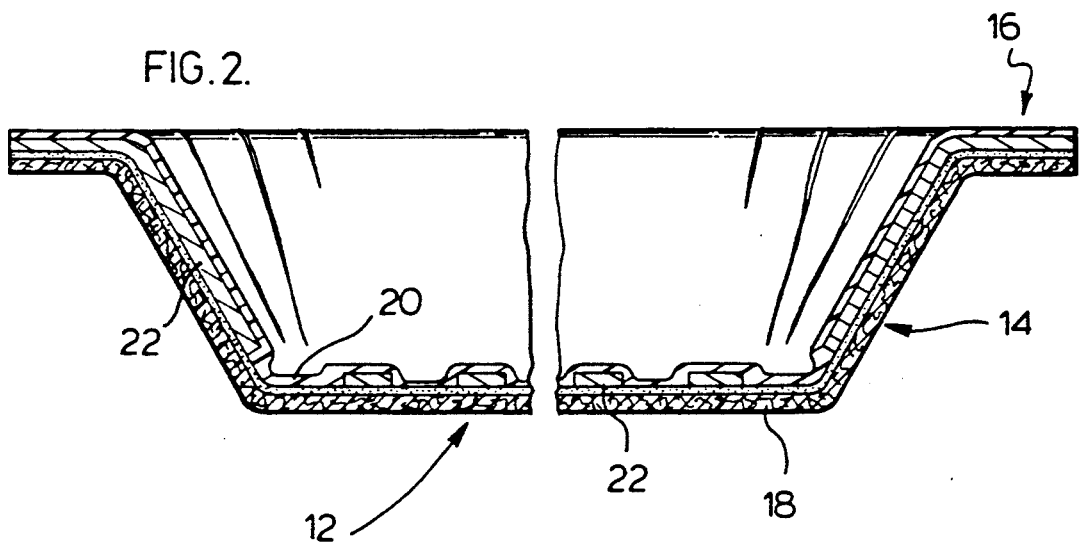
FIG. 2 is a longitudinal sectional view of the microwave-heating tray of FIG. 1.

The form of the laminate at various locations in the tray structure is shown in FIGS. 2 to 4. An outer layer 18 of structural material supports the laminate. An inner polymeric film layer 20 is coincident with the outer layer 18 throughout the structure.

A layer of microwave-reflective material 22 is provided between the outer and inner layers 18 and 20 in the region of the peripheral wall 14 and extending in a pattern 23 (FIG. 1) for a portion of the area of the bottom wall 12.

The microwave-reflective material is absent from the laminate in the area of the bottom wall defined by a rectangular periphery 24 of the pattern 23 of microwave-reflective material.

Although the tray is illustrated as having a rectangular shape, the tray may be provided in a variety of other geometric shapes, such as square or circular.

EXAMPLE

This Example illustrates the beneficial effect obtained using the structure of the present invention.

Macaroni and cheese was placed in a dish constructed as seen in FIG. 1 and in a dish having an aperture only in the bottom wall, such as is described in U.S. Pat. No. 4,351,997. Both samples were exposed to microwave energy in a microwave oven for 5 minutes and the temperature at three locations midway in the depth of the cooked product was determined, namely core, outer edge and an intermediate location. The results obtained are set forth in the following Table I:

TABLE I

| Structure | Temperature °F. | | | |
| --- | --- | --- | --- | --- |
|  | Core | Middle | Edge | Range |
| FIG. 1 | 131° | 160° | 173° | 42° |
| Prior art | 118° | 168° | 171° | 53° |
|  |  | Difference |  | 11° F. |

It will be seen from the results of above Table I that by employing the structure of the present invention, the core temperature is significantly increased, the spread in temperature between edge and core is significantly decreased, by about 20%, and the uniformity of temperature from the edge to the core is improved.

SUMMARY OF DISCLOSURE

In summary of this disclosure, the present invention provides a novel tray structure useful for the microwave cooking of prepared foodstuffs for consumption by incorporating a layer of microwave-reflective material into the structure. Modifications are possible within the scope of this invention.

What is claimed is:

1. A tray for the microwave cooking of a prepared foodstuff contained therein, comprising:
   a bottom wall and an upwardly extending peripheral wall against which said prepared foodstuff is in engagement,
   said tray having a laminate structure comprising an outer layer of a structural material transparent to microwave energy, an inner layer of a flexible polymeric material coincident with said outer layer, and
   a layer of microwave-reflective material located between said inner layer and said outer layer,
   said layer of microwave-reflective material being provided as a continuous layer in the region of said peripheral wall so as to reflect incident microwave energy from said peripheral wall into said prepared foodstuff in the tray,
   said layer of microwave-reflective material extending in a microwave energy controlling pattern along said bottom wall which permits a controlled degree of penetration of incident microwave energy through said bottom wall to channel microwave energy preferentially towards a central region of said tray, which results in an improved uniformity of microwave cooking of the prepared foodstuff in the tray.

2. The tray of claim 1 wherein a rim extends outwardly from said peripheral wall at the top thereof.

3. The tray of claim 1 wherein said microwave-reflective material is aluminum having a thickness of about 1 to about 15 microns.

4. The tray of claim 3 wherein said aluminum has a thickness of about 3 to about 10 microns.

5. The tray of claim 3 wherein said aluminum has a thickness of about 7 to about 8 microns.

6. The tray of claim 3 wherein said outer wall is constructed of paperboard.

7. The tray of claim, 3 wherein said outer wall is constructed of polymeric material.

8. The tray of claim 1 wherein said bottom wall is of generally rectangular shape and said microwave-reflective material layer extends along said bottom wall in a pattern to define a rectangular opening.

9. The tray of claim 8 wherein said pattern comprises an endless strip of said microwave-reflective material formed in said bottom wall in a series of rectangles.

* * * * *